(12) United States Patent
Paek et al.

(10) Patent No.: US 6,568,220 B1
(45) Date of Patent: May 27, 2003

(54) METHOD OF FABRICATING OPTICAL FIBER GRATINGS MAXIMIZING RESIDUAL MECHANICAL STRESS IN THE OPTICAL FIBERS

(75) Inventors: Un-Chul Paek, Kwangju-Kwangyokshi (KR); Young-Joo Chung, Kwangju-Kwangyokshi (KR); Chang-Seok Kim, Pusan-Kwangyokshi (KR); Yong-Woo Park, Seoul (KR); Hyun-Soo Park, Inchon-Kwangyokshi (KR); Kyung-Ho Kwack, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/521,433

(22) Filed: Mar. 8, 2000

(30) Foreign Application Priority Data

Mar. 11, 1999 (KR) .............................. 99-8080

(51) Int. Cl.[7] ............................................ C03B 37/018
(52) U.S. Cl. .............................. 65/392; 65/424; 65/425; 65/477
(58) Field of Search ........................ 65/392, 424, 425, 65/477

(56) References Cited

U.S. PATENT DOCUMENTS

| | | | |
|---|---|---|---|
| 4,022,602 A | * 5/1977 | Pavlopoulos | ................ 65/102 |
| 4,406,517 A | 9/1983 | Olshansky | |
| 4,410,345 A | 10/1983 | Usui et al. | |
| 4,426,129 A | 1/1984 | Matsumura et al. | |
| 4,447,125 A | 5/1984 | Lazay et al. | |
| 4,616,901 A | 10/1986 | MacChesney et al. | |
| 4,810,276 A | 3/1989 | Gilliland | |
| 4,975,102 A | * 12/1990 | Edahiro et al. | ............. 385/127 |
| 5,287,427 A | * 2/1994 | Atkins et al. | ............... 385/124 |
| 5,694,502 A | 12/1997 | Byron | |
| 5,763,340 A | * 6/1998 | Nishii et al. | .................. 501/36 |
| 6,009,222 A | 12/1999 | Dong et al. | |
| 6,050,109 A | * 4/2000 | Kosinski et al. | .............. 65/385 |
| 6,073,464 A | * 6/2000 | Boher et al. | .................. 65/378 |
| 6,125,225 A | * 9/2000 | Dianov et al. | ............. 385/124 |
| 6,192,712 B1 | * 2/2001 | Saito et al. | .................... 65/386 |
| 6,284,685 B1 | * 9/2001 | Borrelli et al. | ................ 501/45 |
| 6,298,183 B1 | * 10/2001 | Yamauchi et al. | ............ 385/37 |

FOREIGN PATENT DOCUMENTS

| | | | |
|---|---|---|---|
| GB | 2 056 965 A | * | 3/1981 |
| JP | 56-011408 | | 2/1981 |
| JP | 56-062204 | | 5/1981 |
| JP | 56-121002 | | 9/1981 |
| JP | 11-038238 | | 2/1999 |
| JP | 11-084151 | | 3/1999 |

OTHER PUBLICATIONS

Machine Translation of JP 11–38238, prepared with http://www1.ipdl.jpo.go.jp/PA1/cgi-bin/PA1INDEX, pp. 1–5, Aug. 2002.*

Mohanna et al, "Relaxation of Internal Stresses in Optical Fibers," Journal of Lightwave Technology, vol. 8, No. 12, pp. 1799–1802, Dec. 1990.*

* cited by examiner

*Primary Examiner*—Sean Vincent
(74) *Attorney, Agent, or Firm*—Robert E. Bushnell, Esq.

(57) ABSTRACT

An optical fiber for maximizing residual mechanical stress and an optical fiber grating fabricating method using the optical fiber are provided. The optical fiber includes a core formed of silica, for propagating light, and a cladding formed of boron-doped silica, surrounding the core. Alternatively, the optical fiber includes a core formed of phosphorous-doped silica and a cladding formed of silica, surrounding the core.

11 Claims, 10 Drawing Sheets

METHOD OF FABRICATING OPTICAL FIBER GRATINGS MAXIMIZING RESIDUAL MECHANICAL STRESS IN THE OPTICAL FIBERS

This application claims priority to an application entitled "Optical Fiber In Which Residual Mechanical Stress Is Maximized and Method For Fabricating Fiber Gratings Using the Same" filed in the Korean Industrial Property Office on Mar. 11, 1999 and assigned Serial No. 99-8080, the contents of which are hereby incorporated by reference.

BACKGROUND OF THE INVENTION

1. Field of the Invention

The present invention relates generally to an optical fiber which maximizes residual mechanical stresses and an optical fiber grating fabrication method using the optical fiber, and in particular, to an optical fiber with mechanical stresses maximized to write optical fiber gratings therein and an optical fiber grating fabrication method using the optical fiber.

2. Description of the Related Art

An optical signal filter plays a significant role in improving the performance of an optical communication system. Filters having optical fiber gratings have recently attracted much interest since they can be fabricated in optical fibers and no other external controlling devices are needed. Optical fiber grating filters find wide application in optical communications and optical sensors due to the advantages of low loss and low cost. Optical fiber gratings are largely categorized into Bragg gratings (reflective or short-period gratings) and long-period gratings (transmission gratings) according to their periods of refractive index changes in an optical fiber core.

The long-period fiber gratings are based on the principle that a great change in a refractive index occurs when irradiating an optical fiber with a UV (UltraViolet) laser beam. An amplitude mask is usually used in writing gratings in an optical fiber core and the photosensitivity of the optical fiber can be increased by loading the optical fiber with $H_2$. A conventional long-period optical fiber is fabricated in an optical fiber having a germanium-doped core. Since gratings are written utilizing the photosensitiveness of the optical fiber, they cannot be formed in a non-photosensitive optical fiber by the conventional technology. Another problem is that hydrogen treatment is required to increase the photosensitiveness of an optical fiber.

Meanwhile, residual stresses has been used instead of photosensitivity. Residual stresses are divided into thermal stress and mechanical stress. The former is caused by the mismatch in the coefficients of expansion coefficients between layers, while the latter is produced by different viscosities between the layers, closely related with tensile force. The thermal stress is not proportional to tensile force and its occurrences are negligible. Thus, the mechanical stress is the dominant residual stress. To maximize the mechanical stress, a good choice of doping materials for a core and a cladding is very important because the viscosities of the core and cladding vary with doping materials.

Examples of optical fiber compositions and optical fiber fabrication methods of the contemporary art are given in the following U.S. Patents. U.S. Pat. No. 4,426,129, to Matsumura et al., entitled OPTICAL FIBER AND METHOD OF PRODUCING THE SAME, describes an optical fiber including a jacketing layer, a cladding layer containing $B_2O_3$ as a dopant, and a core layer having a refractive index higher than the cladding layer.

U.S. Pat. No. 4,406,517, to Olshansky, entitled OPTICAL WAVEGUIDE HAVING OPTIMAL INDEX PROFILE FOR MULTICOMPONENT NONLINEAR GLASS, describes an optical fiber having a multimode core which has silica doped with $GeO_2$ at the center and silica doped with $B_2O_3$ away from the center.

U.S. Pat. No. 4,447,125, to Lazay et al., entitled LOW DISPERSION SINGLE MODE FIBER, describes an optical fiber with germanium doped in the core and fluorine doped in the cladding.

U.S. Pat. No. 4,410,345, to Usui et al., entitled METHOD OF PRODUCING OPTICAL WAVEGUIDE, describes an optical fiber having a cladding made of $B_2O_3$-silica glass.

U.S. Pat. No. 4,616,901, to MacChesney et al., entitled DOPED OPTICAL FIBER, describes an optical fiber having a silica core doped with $P_2O_5$, and a cladding which maybe pure or doped silica.

U.S. Pat. No. 4,810,276, to Gilliland, entitled FORMING OPTICAL FIBER HAVING ABRUPT INDEX CHANGE, discusses optical fibers having fluorine or boron-doped silica claddings, with germanium present in the core.

U.S. Pat. No. 5,694,502, to Byron, entitled BRAGG GRATINGS IN WAVEGUIDES, describes a method of generating a Bragg reflective grating in a photosensitive optical waveguide using a fringe pattern of electromagnetic radiation, and additionally employing heating by a $CO_2$ laser in the region where the grating is being formed. This heating is to enhance the photosensitivity of the fiber.

U.S. Pat. No. 6,009,222, to Dong et al., entitled OPTICAL FIBRE AND OPTICAL FIBRE GRATING, describes an optical fiber having a germanium-doped core and a boron-doped cladding. The patent further discusses a Bragg grating made in the fiber.

SUMMARY OF THE INVENTION

It is therefore an object of the present invention to provide an improved optical fiber for fabrication of optical fiber gratings.

Another object of the invention is to provide an optical fiber with enhanced mechanical stress.

Yet another object of the invention is to provide an optical fiber for fabrication of an optical fiber grating which does not require hydrogen treatment before writing a grating.

A still further object of the invention is to provide an improved method for fabricating an optical fiber grating.

These and other objects are achieved by providing an optical fiber for maximizing residual mechanical stress and an optical fiber grating fabricating method using an optical fiber in which a core or a cladding is doped with a residual mechanical stress maximizing material. The optical fiber includes a core containing silica, for propagating light, and a cladding containing boron-doped silica, surrounding the core. According to another aspect of the present invention, the optical fiber includes a core formed of phosphorous-doped silica and a cladding formed of silica, surrounding the core.

In the optical fiber grating fabricating method, an optical fiber preform is formed to include a cladding formed of boron-doped silica and a core formed of silica, an optical fiber is drawn from the preform by applying a predetermined tensile force to the preform, and gratings are formed in the optical fiber by annealing predetermined periodical portions of the drawn optical fiber and thus relieving residual stresses of the optical fiber.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Long-period optical fiber gratings can be formed utilizing residual stresses in an optical fiber with a pure silica core. Due to a photoelastic effect, tensile force-incurred residual stresses reduce the refractive index of the core. The refractive index returns to its original level by partially relieving the residual stresses by a $CO_2$ laser or an electric arc periodically. Then, the gratings are formed.

As to residual stresses in a step index optical fiber, the step index optical fiber includes a core and a cladding each formed of a different material and thus showing a different characteristic. When the optical fiber is drawn with tensile load and high heat energy, each of the core and cladding layers shifts from a solid state to a liquid state at a different transition temperature and is subject to tensile or compressive stress by heat in each process. A different type of stress is mechanically induced when the optical fiber is cooled at room temperature. These two kinds of residual stresses remain in the optical fiber.

Therefore, the residual stresses include thermal stress and mechanical stress. The former is caused by the difference between the thermal expansion coefficients of layers, whereas the latter occurs due to the difference between the viscosities of the layers and has much to do with tensile force.

As to thermal stress, the core and cladding of an optical fiber are formed of different materials and thus have different thermal expansion coefficients at different glass transition temperatures. It is known that the thermal expansion coefficient of each layer in the liquid state is three times larger than that of the layer in the solid state. Hence, the optical fiber exhibits a very complicated thermal stress profile. But the thermal stress is less significant than mechanical stress as a residual stress and is not easily controlled in a drawing process.

Mechanical stress, caused by the difference of viscosity between a core and a cladding, is proportional to tensile force. Accordingly, residual stresses can be determined by controlling tensile force.

The mechanical stress generation mechanism can be considered in two stages: application of tensile force at high temperature; and release of the tensile force and decrease to room temperature.

In the first stage, a transformation rate based on elasticity and inelasticity is changed depending on the viscosity, surface area, and tensile force of each layer when an optical fiber is drawn at high temperature. The relationship between tensile force F and stress at a melted preform portion can be expressed as $$F = 3\eta_1 A_1 \frac{B_V}{B_Z} + 3\eta_2 A_2 \frac{B_V}{B_Z} \quad \text{[Equation 1]}$$
$$= 3\eta_1 A_1 \frac{B_V}{B_Z}\left(1 + \frac{\eta_2 A_2}{\eta_1 A_1}\right)$$
$$= 3\eta_2 A_2 \frac{B_V}{B_Z}\left(1 + \frac{\eta_1 A_1}{\eta_2 A_2}\right)$$
$$= 3\eta_1 A_1 \frac{B_V}{B_Z} G_1^{-1}$$
$$= 3\eta_2 A_2 \frac{B_V}{B_Z} G_2^{-1}$$

where $\eta$ is viscosity, A is surface area, B is an elasticity coefficient, V is the shift rate of a melted preform portion, Z is the length of an optical fiber in an axial direction, and subscripts 1 and 2 indicate a core and a cladding, respectively.

When the radius of the melted preform portion reaches that of the optical fiber at a softening temperature, an initial stress is calculated by $$\sigma_2^i = 3\eta_2 \frac{B_V}{B_Z} = \frac{F}{A_2} G_1 \quad \text{[Equation 2]}$$
$$\sigma_1^i = 3\eta_1 \frac{B_V}{B_Z} = \frac{F}{A_1} G_1$$

and initial and final elastic transformation rates $\epsilon_1{}^i$ and $\epsilon_2{}^i$ are determined by $$\varepsilon_1^i = \frac{F}{A_1 E_1} G_1 \quad \text{[Equation 3]}$$
$$\varepsilon_2^i = \frac{F}{A_2 E_2} G_2$$

The initial elastic transformation rate lasts until the tensile force is released at room temperature. When the initial state transitions to a final state, the optical fiber immediately recovers to a stable state, a transformation length involving the elastic transformation of each layer is the same in both the initial and final states, and the sum of stresses imposed on each layer is 0. That is, $$\epsilon_1{}^f - \epsilon_1{}^i = \epsilon_2{}^f - \epsilon_2{}^i$$

$$A_1 E_1 \epsilon_1^f + A_2 E_2 \epsilon_2^f = 0 \quad \text{[Equation 4]}$$

Then, $$\epsilon_1^f = -\frac{A_2 E_2}{A_1 E_1} \epsilon_2^f = -\frac{A_2 E_2}{A_1 E_1}(\epsilon_1^f - \epsilon_1^i + \epsilon_2^i) \quad \text{[Equation 5]}$$

Therefore, the transformation of the core in the final state is expressed as $$\begin{aligned}\epsilon_1^f &= \frac{A_2 E_2}{A_1 E_1 + A_2 E_2}(\epsilon_1^i + \epsilon_2^i) \\ &= \frac{F}{A_1 E_1} A_2 E_2 G_1 - \frac{A_1 E_1 G_2}{A_1 E_1 + A_2 E_2} \\ &= \frac{F}{A_1 E_1} g\end{aligned} \quad \text{[Equation 6]}$$

and the residual stress of the core in the final state is $$\sigma_1^f = E_1 \epsilon_1^f = \frac{F}{A_1} g \quad \text{[Equation 7]}$$

Similarly, the transformation and stress of the cladding can be obtained by $$\epsilon_2^f = \frac{F}{A_1 E_1} g \quad \text{[Equation 8]}$$

$$\sigma_2^f = \frac{F}{A_2} g$$

Residual stresses induced thermally and mechanically in an optical fiber are utilized for fabrication of long-period optical fiber gratings. Thermal stress does not involve a tensile force effect and causes a negligibly small change in refractive index relative to mechanical stress. On the other hand, since mechanical stress is proportional to tensile force, it can be relieved by heating the optical fiber with a $CO_2$ laser beam with tensile force released. Different refractive indexes are shown in a stress-relieved portion and a stress-remaining portion which alternate periodically in the optical fiber. A photoelastic effect with respect to a stress-incurred reflectance change is computed by $$\Delta n_r = C_a \sigma_r + C_b(\sigma_\theta + \sigma_z)$$

$$\Delta n_\theta = C_a \sigma_\theta + C_b(\sigma_z + \sigma_r)$$

$$\Delta n_z = C_a \sigma_z + C_b(\sigma_r + \sigma_\theta) \quad \text{[Equation 9]}$$

where $C_a$ and $C_b$ are photoelasticity coefficients of $SiO_2$, $\Delta n$ is a refractive index variation, $\sigma$ is stress, and r, $\theta$, and z are radius, angle, and axial length, respectively. A refractive index in a radial direction is significant to an optical signal propagated through an optical fiber. Stress in an axial direction and a refractive index variation in a radial direction in a single-mode optical fiber are $$\sigma_z = \sigma_{1r}(K\sigma_r, \sigma_\theta)\Delta_{nr} = C_b \sigma_{1r} \quad \text{[Equation 10]}$$

Because $C_b$ is $-4.2 \times 10^{-12}$ $Pa^{-1}$, $n_r$ is a negative value with respect to extensibility $\sigma_{1r}$. This implies that tensile stress decreases and compressive stresses increases a refractive index. Accordingly, an optical fiber should be drawn with a high tensile force, that is, at a higher winding rate at a lower temperature than normal drawing conditions, for fabrication of long-period optical fiber gratings.

Now, there will be a description of doping materials of silica for long-period optical fiber gratings.

An optical fiber is formed by doping silica with germanium, fluorine, phosphorous, boron, and so on. $GeO_2$ and $P_2O_5$ increase the refractive index of silica, whereas F and $B_2O_3$ decrease it. $P_2O_5$ and $B_2O_3$ are used to decrease a process temperature and viscosity.

As $GeO_2$, $P_2O_5$, and $B_2O_3$ increase in mol %, the thermal expansion coefficient of silica doped with them increases. The thermal expansion coefficient of silica doped with F decreases with higher mol % of F. The viscosity of silica glass reaches the highest limit if it is pure silica and decreases if silica is doped with some material.

Figure 1:
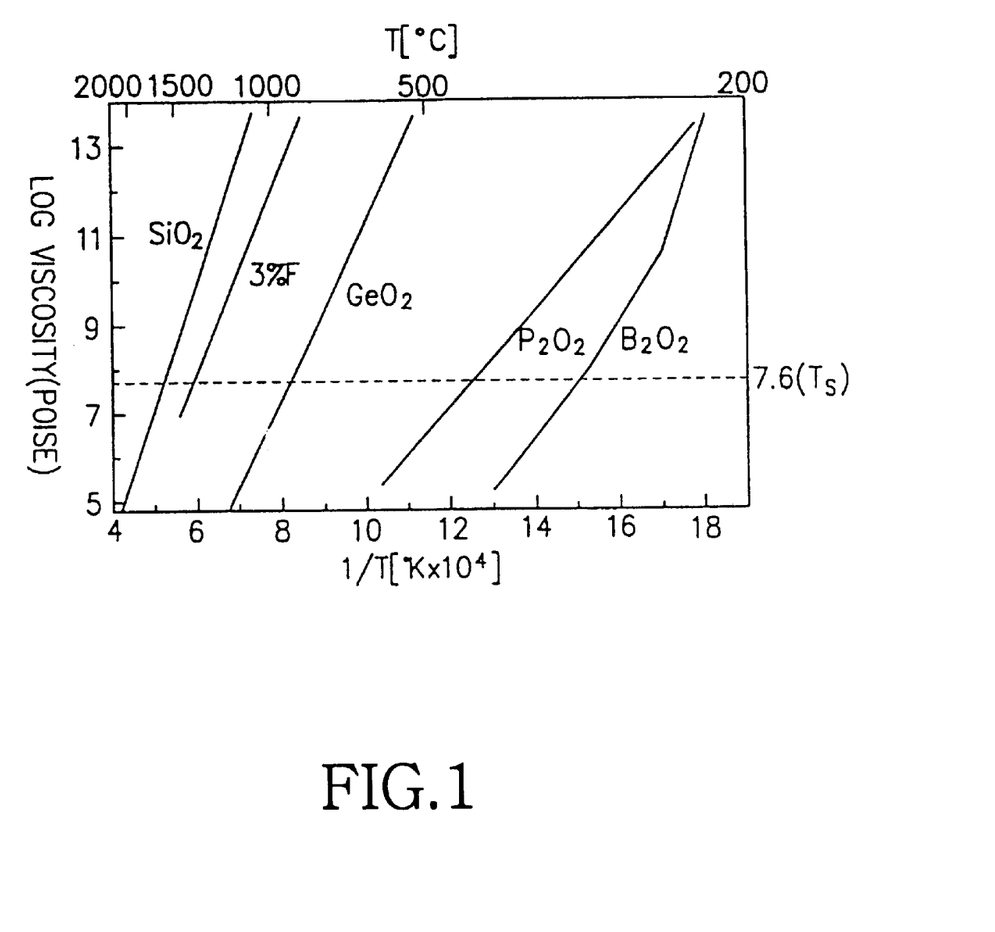
FIG. 1 is a graph showing the relationship between doping materials and viscosity.

FIG. 1 is a graph showing doping materials versus viscosity. A viscosity sensitivity coefficient with respect to a variation in the concentration of a small amount of doping material is $$K_F = \frac{B \log[\eta]}{B[F]} \quad \text{[Equation 11]}$$

$$K_{GeO_2} = \frac{B \log[\eta]}{B[GeO_2]} (\log[PaE_s]/\%)$$

Then, the log viscosities of silica doped with F and silica doped with $GeO_2$ are $$\log[\eta] = K_O + K_F[F] \quad \text{[Equation 12]}$$

$$\log[\eta] = K_O + K_{GeO_2}[GeO_2] \quad \text{[Equation 13]}$$

Here, relative, refractive index differences of silica when it is doped with F and $GeO_2$ are a negative value and a positive value, respectively. They are known to be −0.5 and 1.5, respectively.

The variation of log viscosity in silica glass doped with F and $GeO_2$ is the linear sum of variations in the log viscosity induced by individual F-doping and $GeO_2$-doping. Therefore, the log viscosity of silica glass doped with F and $GeO_2$ is $$\log[\eta] = K_O + K_F[F] + K_{GeO_2}[GeO_2]$$

Figure 2A:
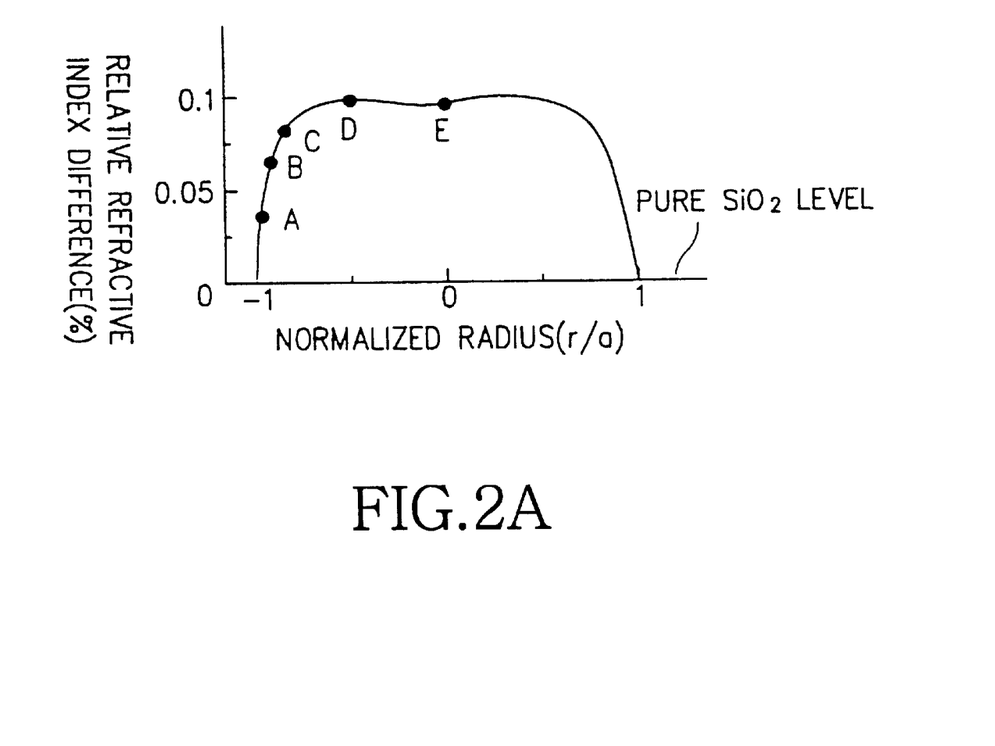
FIGS. 2A and 2B illustrate a relative refractive index profile and viscosity profile of an optical fiber preform having a $P_2O_5\text{-}SiO_2$ core and an $F\text{-}SiO_2$ cladding, respectively.
Figure 2B:
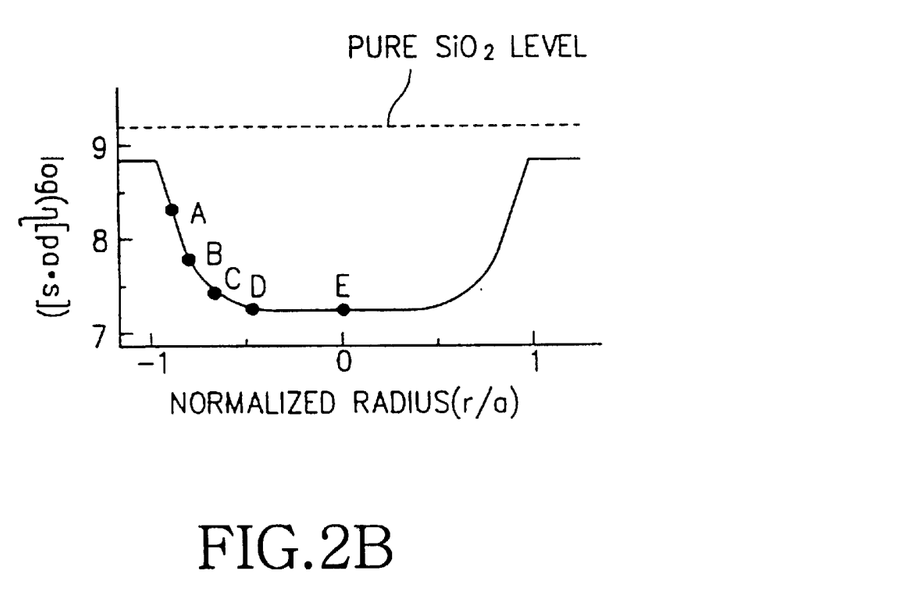
Figure 3:
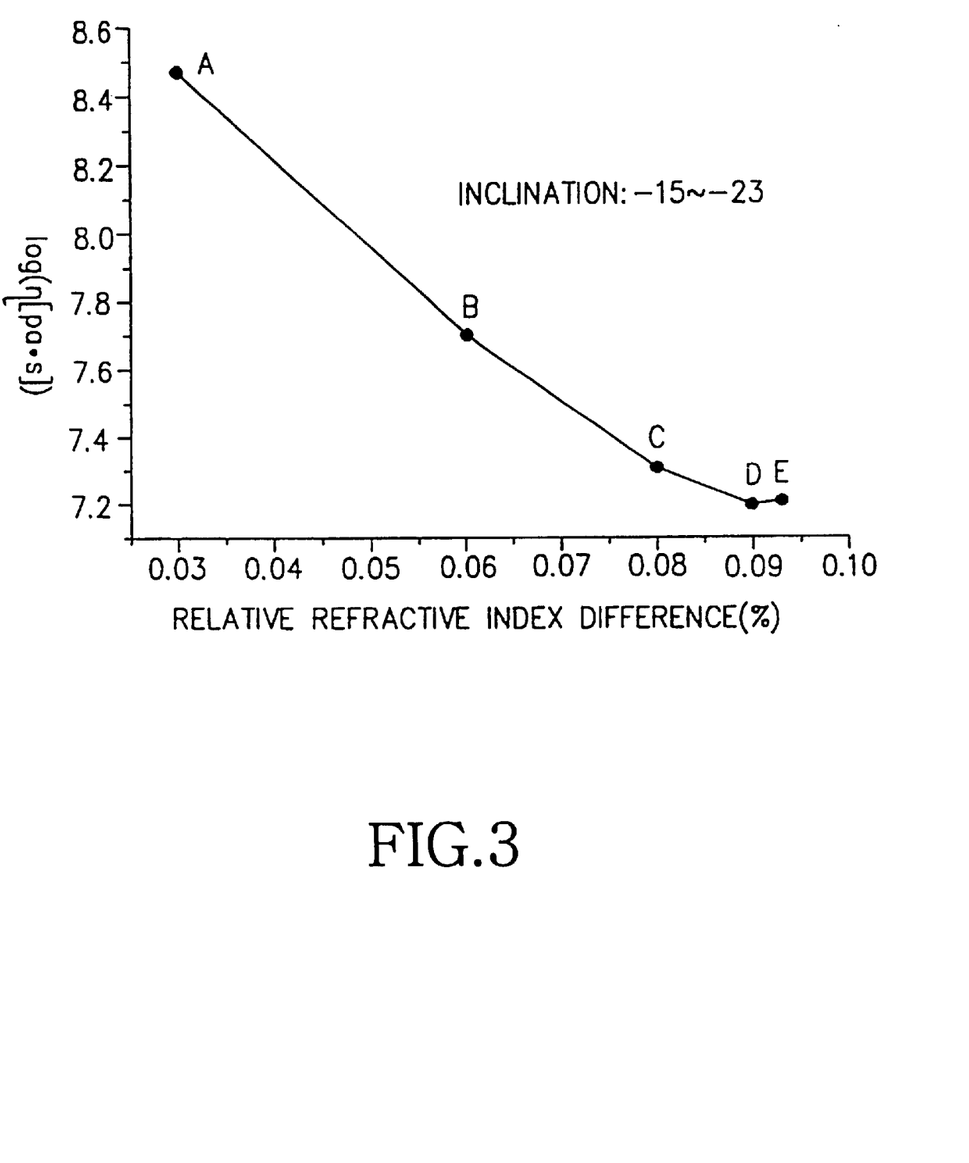
FIG. 3 illustrates viscosity versus relative refractive index differences of the fiber preform of FIGS. 2A and 2B.

FIGS. 2A and 2B illustrate the relative refractive index profile and viscosity profile of an optical fiber preform having a $P_2O_5$-$SiO_2$ core and an F-$SiO_2$ cladding, respectively. FIG. 3 illustrates viscosity versus relative refractive index differences shown in FIGS. 2A and 2B.

The viscosity sensitivity coefficient of $P_2O_5$ ranges between 15 and 23, expressed as Equation 15. That is, the viscosity sensitivity coefficient of $P_2O_5$ is greater than $K_F$ because $P_2O_5$ and $B_2O_3$ drop a process temperature and remarkably increase the viscosity of the glass.

$$K_{P_2O_5} = \frac{B \log[\eta]}{B[P_2O_5]} (\log[PaEs]/\%)$$

Accordingly, the viscosity and process temperature of silica can be further dropped by doping silica with $P_2O_5$, relative to doping silica with F or $GeO_2$. Meanwhile, it is noted from FIG. 1 that the sign of $K_{B2O3}$ is positive due to the negative value of a refractive index variation induced by $B_2O_3$ doping.

Viscosity is closely related with glass transition temperature Tg, the temperature at which glass changes from a liquid state to a solid state. As the viscosity of glass decreases, its glass transition temperature is dropped. This is because the glass transition temperature occurs at a viscosity of about $10^{12.6}$ Pa·s.

Figure 4A:
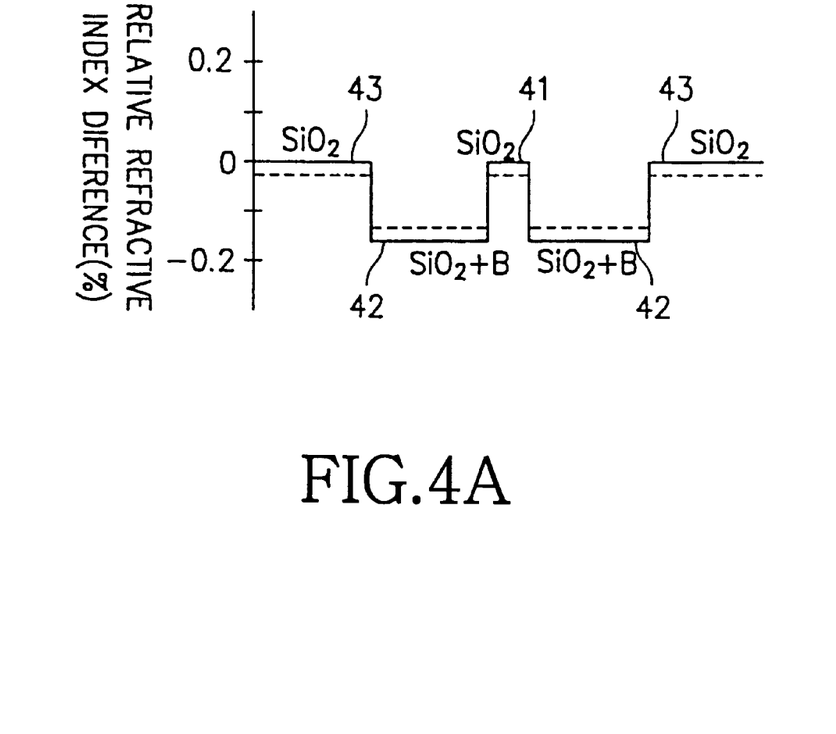
FIGS. 4A and 4B illustrate profiles of optical fibers according to the present invention.
Figure 4B:
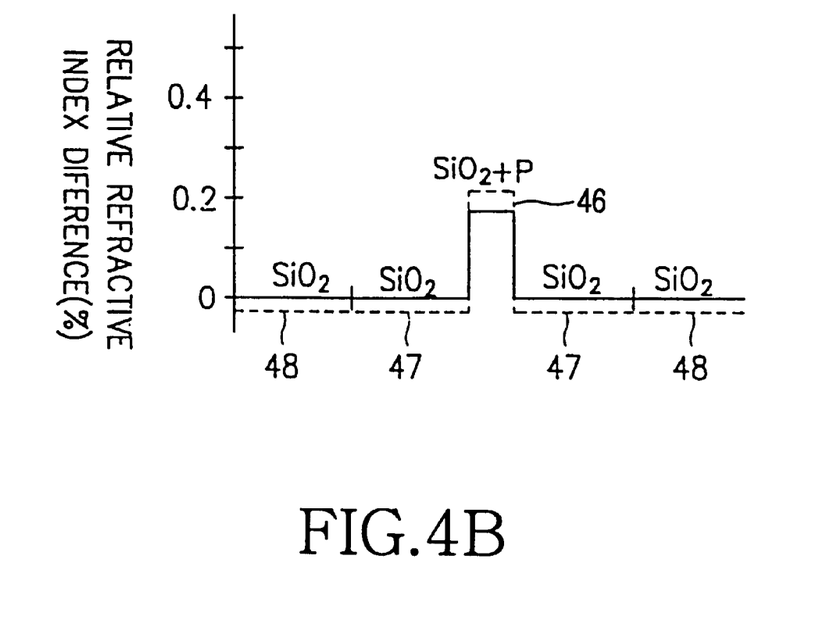

FIGS. 4A and 4B illustrate the profiles of optical fibers according to the present invention. The optical fibers are so constituted that residual mechanical stresses are maximized for forming long-period optical fiber gratings. After an optical fiber is drawn, tensile force is applied on a layer with a relatively high viscosity and compressive force on a layer with a relatively low viscosity. Then, mechanical stress remains in the optical fiber.

In FIGS. 4A and 4B, solid lines indicate the profiles of optical fibers free of mechanical stress, and dotted lines the profiles of optical fibers having mechanical stress.

An optical fiber shown in FIG. 4A has a core 41 formed of silica and a cladding 42 surrounding the core 41, formed of silica doped with boron. A tube 43 covering the cladding 42 is formed of silica and teas a higher viscosity than the cladding 42. Here, due to boron-doping, (that is, $B_2O_3$-doping) the viscosity of the cladding 42 is relatively very low, lower than even that of the core 41. The core 41 can be doped with germanium to increase its refractive index or the cladding 42 can further be doped with fluorine to decrease its refractive index.

An optical fiber shown in FIG. 4B has a core 46 formed of silica doped with phosphorous, a cladding 47 surrounding the core 46, formed of silica, and a tube 48 covering the cladding 47, formed of silica. The tube 48 shows a higher viscosity than the cladding 47. Due to phosphorous doping (that is, $P_2O_5$ doping), the viscosity of the core 46 becomes lower and its refractive index is higher than that of the cladding 47. The core 46 can further be doped with germanium to increase its refractive index or the cladding 47 with fluorine to decrease its refractive index.

Figure 5:
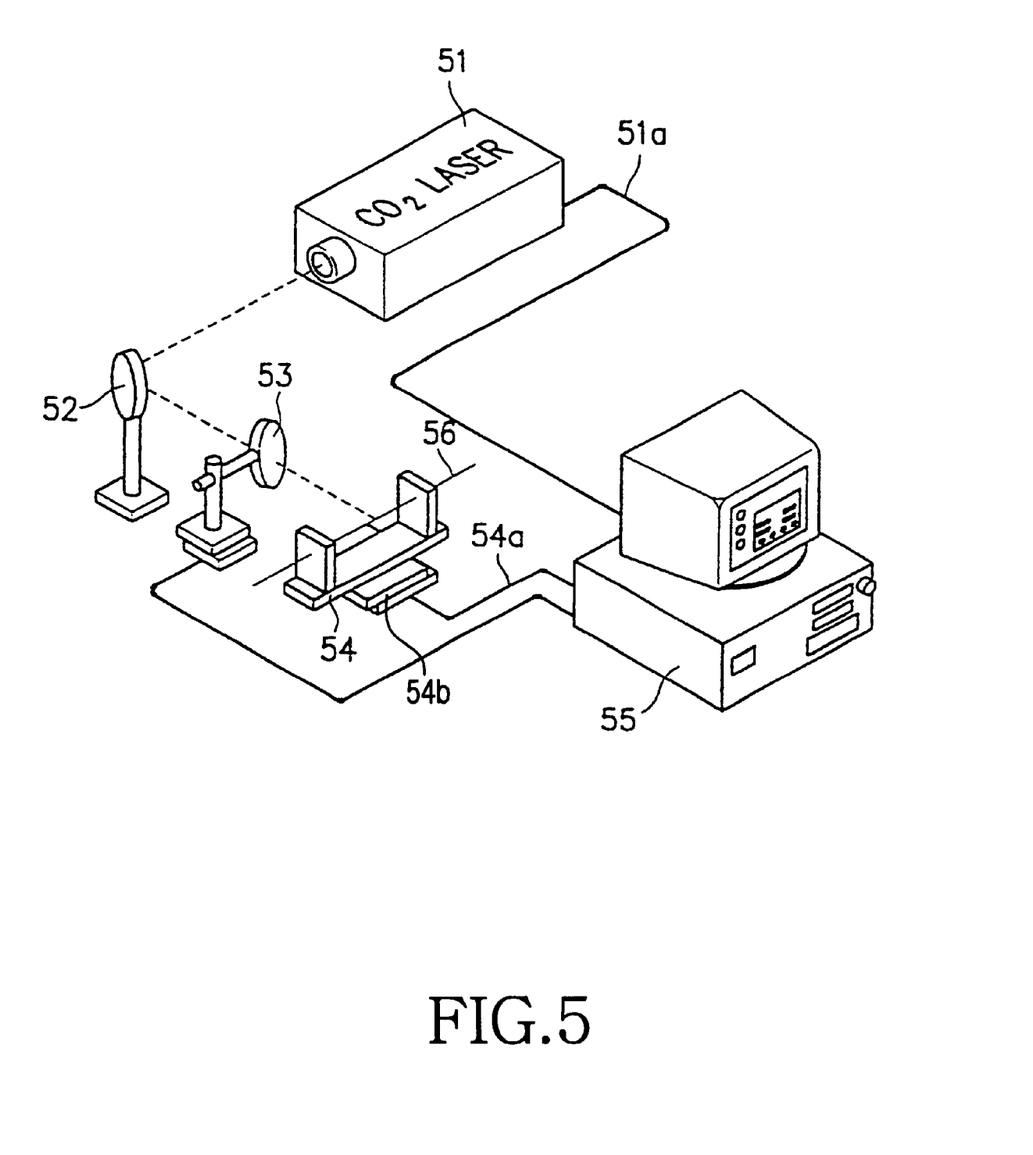
FIG. 5 illustrates a long-period optical fiber grating fabricating device using a $CO_2$ laser.

Now there will be given a description of a method of forming long-period optical fiber gratings in an optical fiber with mechanical stress induced therein using a $CO_2$ laser or an electric FIG. 5 illustrates a long-period fiber grating forming device using a $CO_2$ laser according to the present invention. The long-period fiber grating forming device is comprised of a $CO_2$ laser system 51, a reflective mirror 52, a lens 53, a shelf 54, and a controlling computer 55. The $CO_2$ laser system 51 includes a laser head, a power module, a remote controller, and a connection cable 51a. The laser system 51 emits a $CO_2$ laser beam in pulses so that a user can adjust the intensity and power of the emitted laser beam. The pulse width and period can be controlled by the remote controller or a pulse generator connected to the remote controller. The reflective mirror 52 is plated with gold and used for controlling a beam path. The lens 53 is fabricated of ZnSe, for focusing a laser beam with an appropriate width.

The shelf 54 including an optical fiber fixture is moved by a high-resolution stepping motor 54b controlled by the computer 55 through an interface bus, such as a GPIB (General Purpose Interface Bus) 54a. A white light source and a spectrum analyzer can be further provided to observe the transmission spectrum of long-period fiber gratings during fabrication of the long-period fiber gratings.

Figure 6:
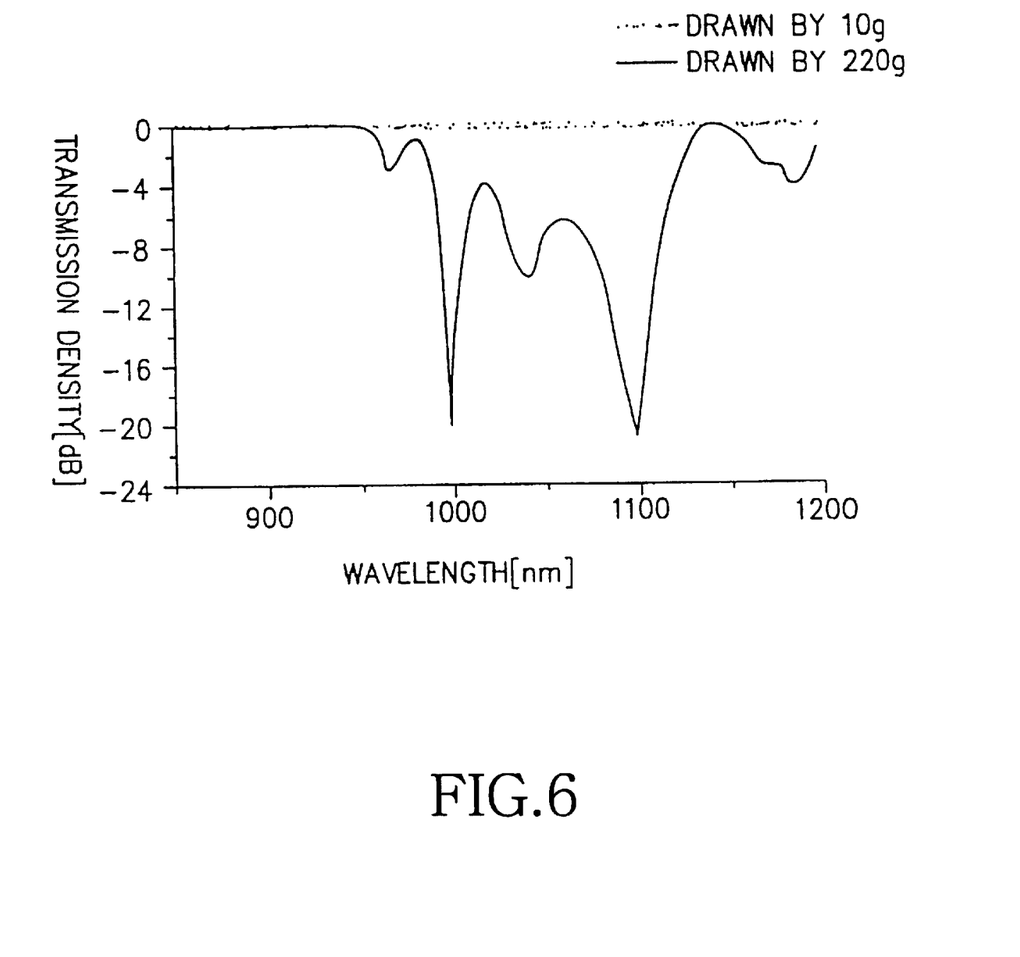
FIG. 6 is a graph showing the transmission spectrum of long-period optical fiber gratings formed in a silica core/boron-doped cladding DIC (Depressed Inner Cladding) optical fiber.

FIG. 6 is a graph showing transmission spectrum characteristics of long-period fiber gratings formed in a silica core/boron-doped DIC optical fiber. In FIG. 6, a dotted line indicates transmission intensity versus wavelength of an optical fiber drawn with a 10 g tensile force, and a solid line indicates transmission intensity versus wavelength of an optical fiber drawn with a 220 g tensile force. Here, the grating period is 500 $\mu$m, the power of an output beam is 18W, an exposure time is 0.2 sec, and the width of a beam is 200 $\mu$m. Thus, the energy density is 1.7 J/mm². The fiber is exposed for one exposure time, the fiber is moved by one beam-width, and then exposed again.

Referring to FIG. 6, the optical fiber drawn with the 10-g tensile force shows no filtering effect, whereas the optical fiber drawn with the 220-g tensile force exhibits a band rejection filter characteristics with a peak of 20 dB at 10000 nm and a bandwidth of 25 nm. A changed refractive index of the stressed regions long-period fiber gratings is returned to its original refractive index by relieving residual stresses in portions of an optical fiber exposed to a beam periodically.

Figure 7:
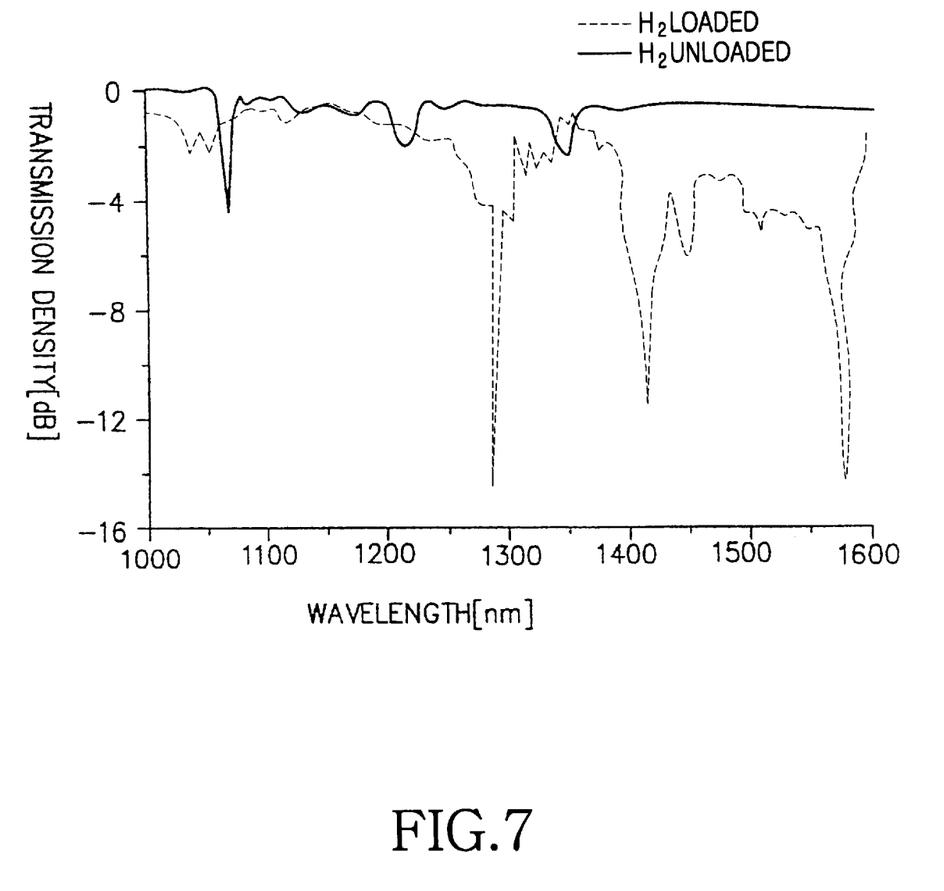
FIGS. 7 and 8 illustrate the transmission spectra of a long-period optical fiber grating formed in a P-doped core/matching cladding optical fiber with D/d=4 and 8, respectively.
Figure 8:
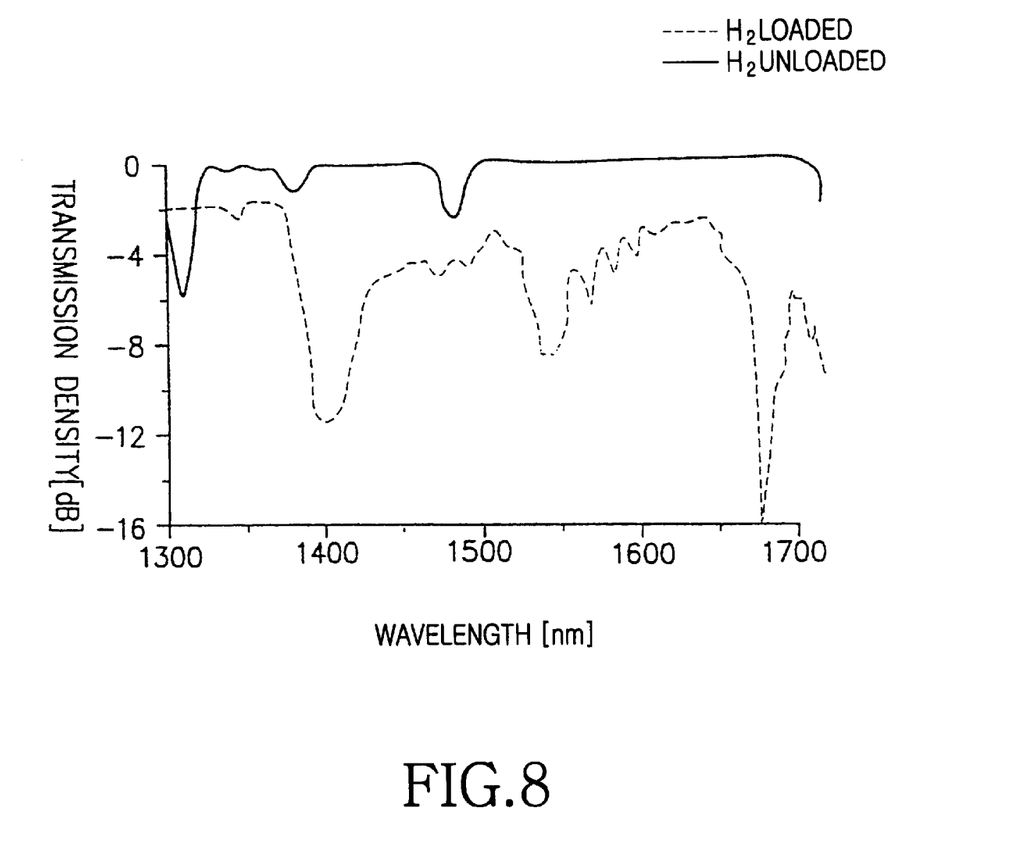

FIGS. 7 and 8 illustrate the transmission spectra of long-period fiber gratings formed in a P-doped core/matching cladding optical fiber, respectively with D/d=4 and 8 (D is the radius of a cladding from the center of the core and d is the radius of the core). In FIGS. 7 and 8, dotted lines indicate $H_2$ loaded cases and solid lines $H_2$ unloaded cases. Long-period fiber gratings are formed under the conditions that the grating period is 500 $\mu$m, the grating length is 2 cm, the power of an output beam is 12W, an exposure time is 0.2 sec, and the width of a beam is 377 $\mu$m. Therefore, the energy density is 1.2 J/mm².

As expected from the residual stress calculation, long-period fiber gratings written in P-doped core/matching cladding optical fibers at D/d=4 and 8, respectively show a weaker filtering effect than in an optical fiber with a core layer to which tensile force is applied. However, the filtering effect can be improved by increasing the grating length or loading the optical fiber with $H_2$. While a writing sensitivity is increased by $H_2$ loading at 100°C. at 100 bar for 72 hours, a pitch shifts toward a long wavelength.

Figure 9:
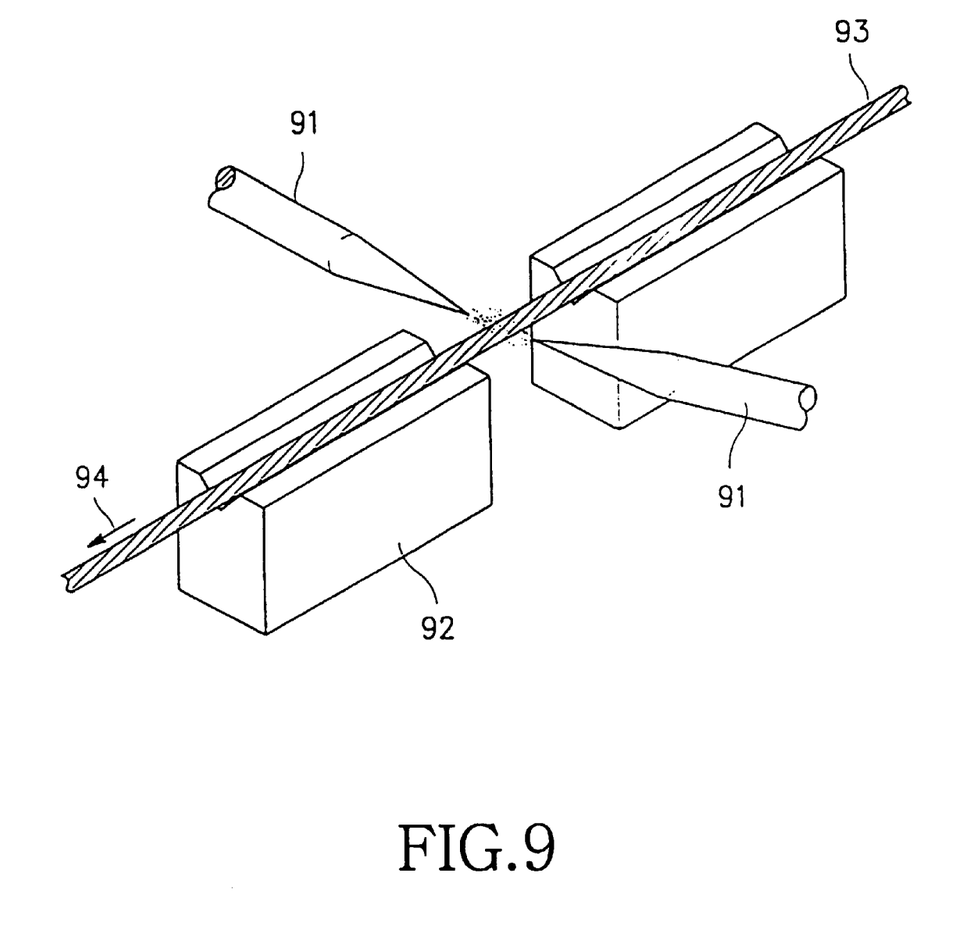
FIG. 9 illustrates a long-period optical fiber grating fabricating device using an electric arc.

FIG. 9 illustrates a device for forming long-period fiber gratings using an electric arc. A pair of electrodes 91 adjust a discharge voltage. An optical fiber 93 is placed on a V-groove 92 and moves by a predetermined distance periodically in a direction indicated by an arrow 94.

Figure 10:
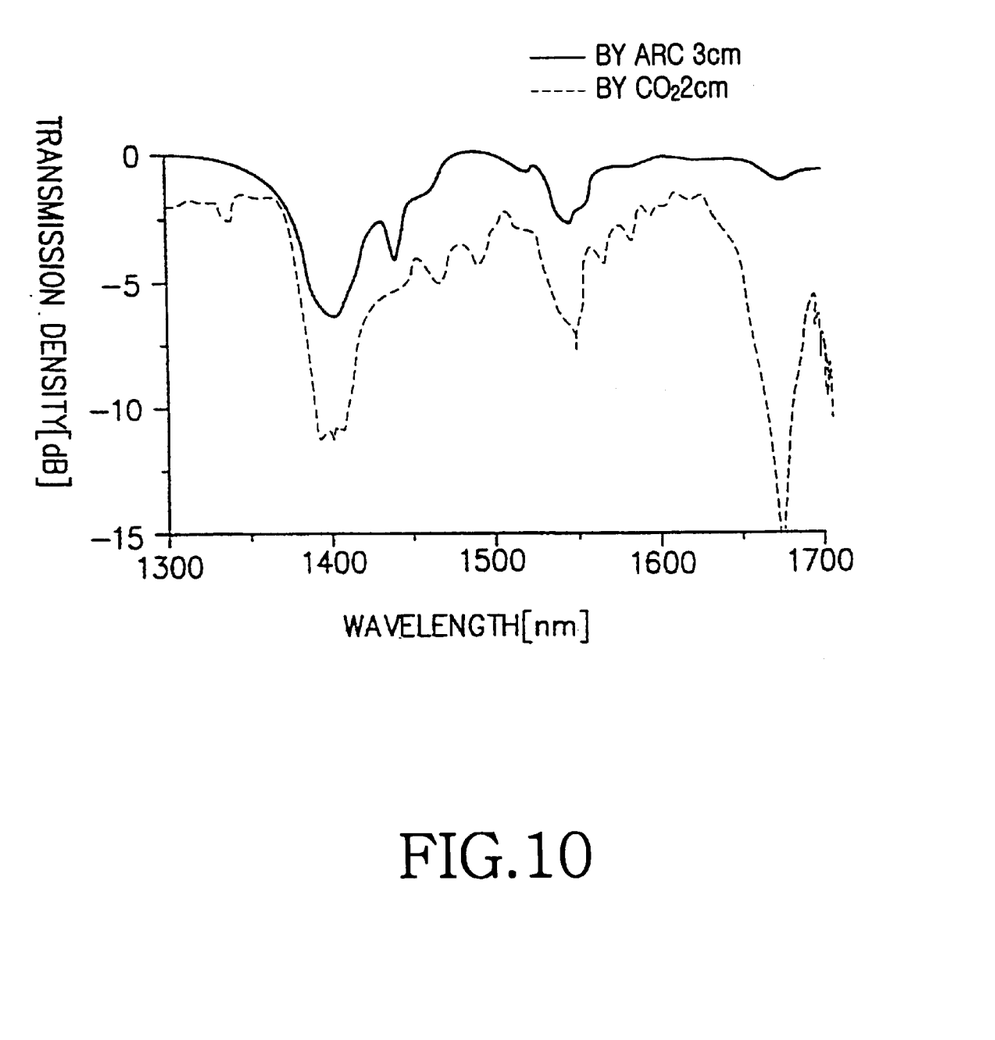
FIG. 10 is a graph showing the transmission spectra of a long-period optical fiber grating formed in a P-doped core/matching cladding optical fiber with D/d=8 using an electric arc and a $CO_2$ laser.

FIG. 10 illustrates the transmission spectra of long-period fiber gratings when they are formed in P-doped core/matching cladding optical fibers with D/d=8 by an electric arc and a $CO_2$ laser, respectively. In comparison, coupling peaks appear almost at the same position and the efficiency of the electric arc is inferior to that of the $CO_2$ laser at a coupling mode. This is because a discharge time cannot be adjusted and an annealed boundary is not clear in the electric arc method.

More residual mechanical stresses are induced as the difference of viscosity between layers of an optical fiber is wider and a greater tensile force is applied. Thus, refractive index changes to a great extent and a long-period fiber grating effect are enhanced. Therefore, the present invention enables formation of long-period fiber gratings with improved performance by adding P or B which remarkably reduces viscosity in an optical fiber.

As described above, residual mechanical stresses are maximized by adding P which drops viscosity markedly in a core or a cladding of an optical fiber according to the present invention. Thus, long-period fiber gratings can be written in the optical fiber more effectively.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical fiber grating manufacturing method, comprising the steps of:

forming an optical fiber preform, said optical fiber preform comprising:

a core comprising silica; and a cladding surrounding said core, said cladding comprising silica, with a value of refractive index of said cladding being lower than a value of refractive index of said core;

drawing an optical fiber from said optical fiber preform with a force in a state in which a viscosity of said cladding is higher than a viscosity of said core to provide said core and said cladding of the drawn optical fiber with residual stress such that refractive indexes of said core and said cladding of the drawn optical fiber are changed; and forming a grating in said drawn optical fiber by spatially periodically annealing regions of said drawn optical fiber to relieve residual stresses in said drawn optical fiber in said annealed regions.

2. The method of claim 1, further comprised of:

said cladding consisting essentially of silica; and said core consisting essentially of silica and $P_2O_5$.

3. The method of claim 1, further comprised of:

said cladding consisting essentially of silica and fluorine; and said core consisting essentially of silica and $P_2O_5$.

4. The method of claim 1, further comprised of said step of forming a grating further comprising the step of:

annealing regions of said drawn optical fiber to provide said annealed regions by heating with a $CO_2$ laser.

5. The method of claim 1, further comprised of said step of forming a grating further comprising the step of:

annealing regions of said drawn optical fiber to provide said annealed regions by heating with an electric arc.

6. The method of claim 4, further comprised of said step of forming a grating further comprising the steps of:

mounting said drawn optical fiber in an optical fiber fixture;

exposing a region of said drawn optical fiber to a $CO_2$ laser beam from said $CO_2$ laser focused to a beam width by a lens;

moving said drawn optical fiber fixture using a stepping motor; and exposing another region of said drawn optical fiber to said $CO_2$ laser beam.

7. The method of claim 4, further comprising the step of:

after drawing said optical fiber and before forming said grating, loading said drawn optical fiber with $H_2$.

8. The method of claim 7, further comprised of:

relieving residual stresses in said drawn optical fiber in said annealed regions to change a refractive index in said annealed regions from a refractive index corresponding to stressed material in said annealed regions to a refractive index corresponding to unstressed material in said annealed regions.

9. The method of claim 1, further comprised of:

relieving residual stresses in said drawn optical fiber in said annealed regions to change a refractive index in said annealed regions from a refractive index corresponding to stressed material in said annealed regions to a refractive index corresponding to unstressed material in said annealed regions.

10. The method of claim 1, with said core and said cladding being nonphotosensitive material.

11. The method of claim 1, further comprised of:

said core consisting essentially of silica doped with phosphorous and germanium; and said cladding consisting essentially of silica doped with fluorine.

* * * * *